June 20, 1961
A. J. P. MARTIN
2,989,443
DISPLACEMENT CONDENSATION PROCESS FOR THE
SEPARATION OF CLOSE BOILING MATERIALS
Filed Dec. 3, 1957
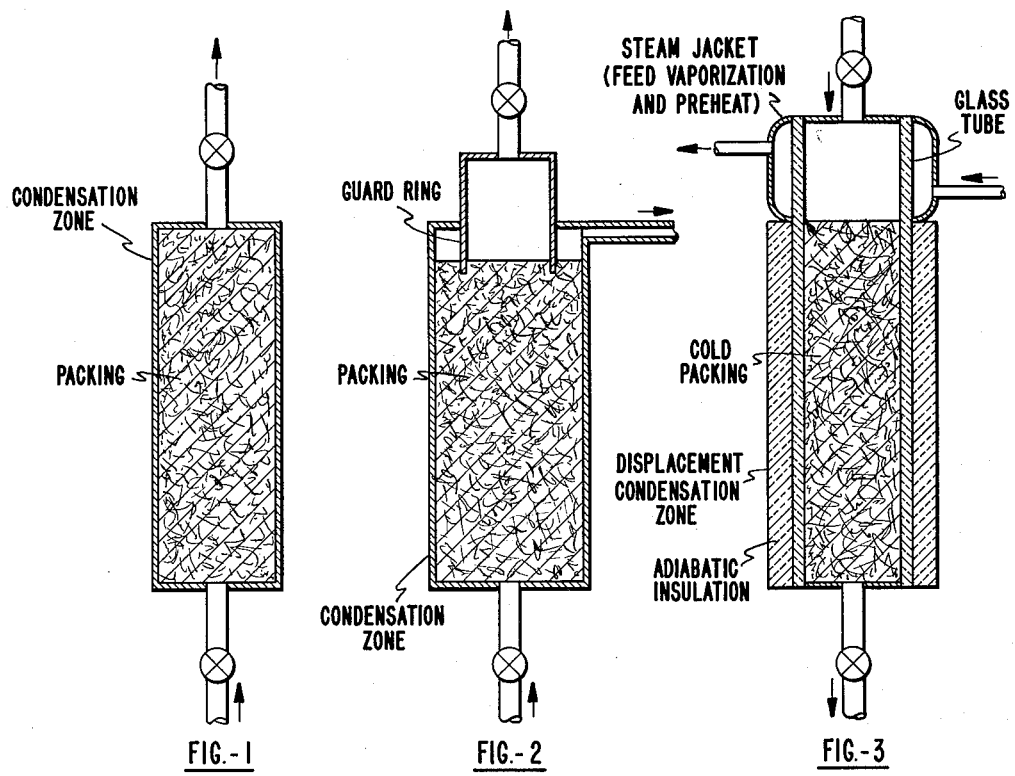
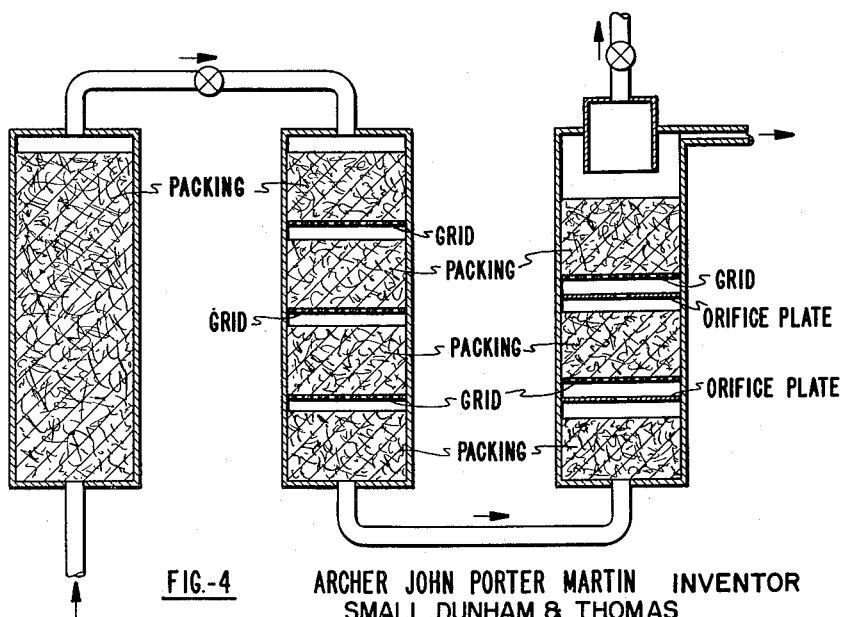
ARCHER JOHN PORTER MARTIN INVENTOR
SMALL, DUNHAM & THOMAS
BY Richard H. Nagel
PATENT ATTORNEY

United States Patent Office 2,989,443
Patented June 20, 1961

2,989,443
DISPLACEMENT CONDENSATION PROCESS FOR THE SEPARATION OF CLOSE BOILING MATERIALS
Archer J. P. Martin, Elstree, England, assignor to Esso Research and Engineering Company, a corporation of Delaware
Filed Dec. 3, 1957, Ser. No. 700,286
Claims priority, application Great Britain Dec. 6, 1956
18 Claims. (Cl. 202—69)

This invention relates to a new method and apparatus for the separation of gaseous material, including vapourised liquid materials. More particularly, it relates to a new method of separating mixtures of such gaseous materials by a process of displacement condensation, which achieves a high separating efficiency at high capacity without any transfer of materials as the liquid phase within the separating zone.

Processes for the separation or refining of naturally-occurring mixtures to recover therefrom pure compounds or concentrates enriched in certain desired components have been of enormous technical importance. Refining industries such as the petroleum industry, essential oils, the gas industry and the liquefaction of air may be mentioned as specific examples of industries where such processes are of major importance.

It is usually difficult to separate any pure material from one of these naturally-occurring mixtures, however, because the various components present are quite similar in such respects as molecular weight, relative volatility or other physical properties on which such separations depend.

The new process which I call displacement condensation has marked advantages over previous generally known refining techniques. It combines a high separating efficiency which may be equivalent to many hundreds or thousands of distillation stages with high capacity and with a high thermal efficiency which makes it particularly attractive for large-scale or commercial operations.

The new principle of displacement condensation which I employ differs radically from all these previous refining operations. The separation obtained depends upon initial temperature differences set up in a system including a cold packing and changes in these temperatures resulting from the condensation and progressive displacement of vapours condensed thereon. The separation obtained depends upon relative volatility, as in fractional distillation, but there is no liquid reflux or transfer of liquid as the liquid phase within the system. The process requires no selective affinity for any component of the original vapour mixture, so that the packing material used acts primarily as a condensing surface rather than as a selective adsorbent. Capacity is not affected by concentration, and the absence of any reflux or countercurrent flow within the system gives an enormous advantage over such processes as distillation or solvent extraction. Starting with a cold packing, the temperature is initially low enough to condense at least a portion of the most volatile constituent which is to be recovered in pure form. The column establishes its own temperature gradient, determined by the heat released as latent heat of vapourisation of the condensing materials. This operation is adiabatic, not isothermal, so that the only heat effects involved are those of the condensing and revapourising material within the column.

In the drawings:
FIG. 1 represents the separation apparatus adapted for use in the practice of the invention;
FIG. 2 represents the separation apparatus having an annular guard ring;
FIG. 3 represents a modification of the present invention;
FIG. 4 represents another modification of the present invention.

More specifically, this invention provides a method of separating mixture of volatile materials, which comprises introducing a gaseous stream of said material into a packed condensation zone containing a cold porous packing having a free volume sufficient to retain and immobilise all liquid condensed out of the gas stream onto the initially colder packing material, starting at a temperature which is below the condensation temperature of the most volatile constitutent of the mixture, condensing at least a portion of said most volatile constituent on the packing which is thereby warmed to said condensation temperature, continuing the introduction of the gaseous mixture and thereby progressively warming the packing by the heat content of the incoming gas and by the progressive condensation thereon of less volatile constituents of the mixture having higher condensation temperatures, said further warming vapourising from said packing the more volatile materials initially condensed thereon to establish a series of advancing fronts of revapourised material progressively enriched in concentration of the less volatile constituents of said initial gas mixture, with the most volatile materials advancing first through and out of the condensation zone.

An important new step in this process is making use of the change in temperature which has been avoided or dissipated in previous processes for selective adsorption or gas chromatography. All of these processes involve temperature and heat effects which affect the selectivity and capacity of the system, and these effects have been minimised by maintaining the system under isothermal conditions. Here, instead, warm vapour is passed into a cold column, causing liquid to condense, and the heat released in this condensation starts warming the packing at the inlet point to the boiling point of the incoming vapour. With a packing cold enough to condense at least part of the most volatile material present, all less volatile materials will be condensed to a greater degree at the same time. The less volatile materials have, of course, a greater tendency to condense. They therefore drive the more volatile materials ahead of them through the column by continued re-evaporation and enrichment, since their heat of condensation increases the temperature of the packing above the boiling point of the more volatile materials. As the column is progressively warmed by the condensation process, it finally reaches a point where the temperature at the exit rises just to the boiling point of the lightest constituent advancing through the column. Vapours of the pure, most volatile constituent will then issue from the exit at this temperature, followed by successive fronts or regions of high concentration of each of the respectively less volatile constituents within the column. It may be noted that this advancing front of vapour drives out of the column ahead of it any initial fixed or permanent gas such as air which may have been filling the system.

As the operation continues, vapours of the purified lightest constituent continue to issue from the condenser and the successive fronts of respectively less volatile constituents approach the exit. In one form of operation, the supply of the original mixed feed is terminated before the second of these advancing fronts reaches the exit. For the best results the exact time at which this feed is discontinued may be related to the difficulty of the particular separation involved. The incoming vapour is now replaced with the vapours of either a portion of the previously separated least volatile component of the original mixed feed, or a substance less volatile than any in the mixture. The material within the condenser column will now separate into more or less pure zones arranged in order of their volatility, followed by a narrow final zone containing displacing vapour at its inlet temperature. The fronts of separation of other materials in these succeeding zones determine the amounts of initial feed which can be separated in a column of given length. In a long column, these zones will pass down the column without further change, each zone except the last characterised by a temperature representing the boiling point of the pure component or mixed component present in that particular region at the operating pressure employed. Thus, if the displacing agent is introduced at its boiling point, this will also be the temperature of the last zone.

In practice, each zone will overlap more or less with the succeeding zone, the width of the overlapping region depending upon the efficiency of the packing and the difference in volatility of the two components, in a manner exactly analogous to that obtained in a fractional distillation column. The feed of the displacing agent is continued until all the more volatile constituents of the original feed mixture have been displaced from the column. The total length of the column, or conversely the total amount of feed to a column of given length, is advantageously chosen so as to gradually and completely eliminate the zone of original feed condensate or any binary mixture derived therefrom which is to be resolved before these advancing zones reach the outlet.

At the end of this operation, the packing within the column may be restored to its original state and temperature by reducing the pressure until the displacer has totally evaporated. The heat of vapourisation of the liquid removed from the packing in this operation is exactly equal to the heat of condensation which warmed the packing from its original cold state. Accordingly, the vapourisation of this condensed liquid cools the packing back to its starting temperature, except for any cold lost by heat leaks into the system. The slight adjustment of the packing temperature necessary to compensate for such heat leaks is made by flowing into the bed a stream of any gas at the desired temperature. In most cases, dry air is suitable for this purpose.

It is also entirely possible to complete the operation without using an extraneous supply of displacing vapours, relying upon the least volatile material already condensed in the system to serve this function. Thus, if the pressure on the exit end of the packed condenser is reduced while there are still several fronts of different materials within the column, each of these will be displaced out of the column and recovered in the exit and by evaporation at the packing temperature, as the pressure falls.

It is also possible to remove the condensed material from the separation zone by elution or stripping with a suitable gas which is not condensed at the operating temperature and pressure employed. This elution principle may give a somewhat better separation between advancing fronts within the column, but the packing is heated by the fixed gas so that the evaporation of the condensed liquid does not restore the system to the original cold condition. It is therefore preferred that the temperature of the gas be that at which it is desired to initially operate the process.

A permanent gas may be employed. Where the column is operated at elevated temperatures and contains combustible substances such as organic compounds the gas may be a gas which does not support combustion nor react with the contents of the separating zone e.g. a lighter parafin or carbon dioxide.

Another convenient method of operating the process is to stop the supply of the mixture of volatile materials as above, before the capacity of the unit to separate the most volatile material in the desired purity is exceeded, and then to purge the column with the previously purified, least volatile material of the mixture in gaseous form. The packing in the condensation zone may then be cleaned off by stripping the condensate from the packing.

From the foregoing description it will be realised that between two adjacent bands of pure material condensed on the packing there will exist an intermediate band consisting of a mixture of the materials of the adjacent bands. As mentioned before the feed mixture should be stopped during the collection of the most volatile fraction. The materials already condensed on the column may be collected by replacing the feed mixture by a less volatile material. This less volatile material may conveniently be a constituent of the feed mixture. The feed mixture should be replaced by the less volatile material at a stage in the process which will allow separation, before the end of the column is reached, of the intermediate band consisting of a mixture of the materials of adjacent bands.

From mass balance the rate of movement of the zones may be calculated provided the following assumptions be made.

(1) The pressure drop down the column is negligible.
(2) The HETP is zero.
(3) Heat capacity of column is uniform and flow resistance is uniform.
(4) The heat loss and the heat capacity of column walls are zero.
(5) The amount in the vapour state is negligible compared with the amount in liquid state at any cross section.

Consider the separation of a mixture of two volatile substances A and B. Suppose the mixture is applied to a column of unit area at initial temperature $T_o$. Suppose the rate of application is F grams/sec. and the mixture contains "$a$" grams of A and "$b$" grams of B. Let the volatility ratio be $\alpha$ and B the less volatile substance. Let heat capacity of column $H_c$ cal./° C. per cm. of column and the latent heat of vapourisation be L cal./g. of liquid in equilibrium with feed, and the boiling point, at column pressure, be $T_{ab}$ of liquid in equilibrium with feed. Let ratio of movement of the fronts be R in cm./sec. Let $h$ cm. be the length of the column. Then, in order that the mixed zone shall disappear as it reaches the end of the column, the application of the mixed feed A and B must be stopped at time $T_{ab}$ seconds and replaced by a feed of material B or the equivalent of B.

$$T_{ab} = \frac{h(\alpha-1)(a+b)H_c(T_{ab}-T_o)}{F_{ab}(a+\alpha b)L_{ab}}$$

This calculation is based on the assumption that the rate at which pure B is applied, when the application of the mixed feed is stopped, is such that $R_{ab}$ is unchanged.

By substitution in the above equation the time will be given at which the feed mixture should be replaced by the lesser volatile material.

In the practice of my invention, the only means by which liquid gets from one particle in the condensation zone to the next is by being re-evaporated from the packing surface by the heat content and latent heat of condensation of additional incoming feed. This differs radically from what would ordinarily be considered a packed condenser. No liquid moves through the column, and vapour moves only by re-vapourisation in equilibrium with condensed liquid, so mass transfer occurs only with repeated interchange from vapour to liquid and back to vapour. A tightly packed column is desired, to block open channels for the free transfer of vapours and thereby improve the gas-liquid equilibration at each state as the material advances through the column. The packing is preferably a finely divided solid.

An important factor in determining the number of separating stages for a given length of condenser is the size of the individual packing particle. It is the size of the particle and not the size of the pores within the particle which is the relevant factor in this respect.

The size of the pores and the free surface and shape of the particle has an effect on the amount of liquid which can be held in the particle without its flowing within the bed or becoming entrained in the gas stream.

Packing having a high ratio of solid to surface in the individual particle reaches its liquid retention capacity sooner, so the preferred particle should have an openwork structure, with channels or cracks. Small pore size may have an adverse effect on the diffusion of liquid within the particle. This factor enters into discussion because the material first condensed has to diffuse outward through relatively less volatile material which is subsequently condensed on the same particle. It is generally best to use packing having fairly large surface area, no small pores, and high free space between the particles. One packing which has been found very satisfactory is kieselguhr.

Other materials which may be used include, powdered glass, glass fibre, wool, cotton, paper, sawdust, solvent extracted sawdust, nonactivated charcoal and coke. The packing may have a size between 300 mesh and 0.1 mm. A packing with a particle size between 30 to 50 mesh is preferred.

While preferred packing materials may be those which do not exhibit selective adsorptive properties, materials having such properties are not necessarily excluded. If the packing is a selective adsorbent, the two effects will simply be superimposed. The chief difference is that the heat of adsorption is quite large on such materials, compared to the simple heat of vapourisation of the liquid. Such materials are more difficult to strip in a cyclic operation, and in addition to this the increase in heat effect uses up part of the temperature drive available and cuts the capacity of the system. This is to be avoided, unless the selective adsorption action has in itself a desirable effect which more than counterbalances these disadvantages. Adsorbents such as silica gel or charcoal are ordinarily not preferred, therefore, whereas materials which are good as contact agents for the liquid-coated type of partition gas chromatogram would usually be suitable.

A particularly suitable packing is a ground up fire brick made from kieselguhr, or selected large particles of the original kieselguhr. This material takes up something like its own weight of liquid before it gets liquid-logged. A 30–50 mesh material is found to be very satisfactory, although a somewhat smaller size may be used without encountering too large a pressure drop through the column. A fairly narrow range of particle sizes is usually most desirable, because it is very essential to get uniform packing across the width of the column. Lack of homogeneity along the length does no damage, but lack of homogeneity must be carefully avoided across the width of the column so as to minimise distortion or by-passing of liquid in the advancing fronts of materials being separated. Pressure drop along the length of the column has no inherent effect, except that it may affect the relative volatilities of the materials being separated. The usual relationships between pressure drop, costs of compression and vapour weight capacity of the system per unit volume are, of course economic factors to be considered.

The linear flow rate of feed to the system should not be too low, for best results, and this is an important feature of the invention. The optimum flow rate is set by the relationship of separating efficiency to velocity, in which diffusion processes are controlling. Separating efficiency is measured in terms of height of column equivalent to a theoretical plate (HETP) as in fractional distillation. There are three distinct processes involved: longitudinal diffusion along the column tends to wipe out the separation obtained, and is the factor which increases the HETP at very low velocities. This rate of gaseous diffusion is only a few inches per hour at best, which is a serious factor limiting the usefulness of most processes depending upon it. In the present invention, by contrast, the linear velocity of gas through the column is substantially higher than the gaseous diffusion rate, preferably from about 0.1 to 10 feet per second or more. Accordingly, the effect of this longitudinal diffusion is negligible in ordinary operating ranges. Crosswise diffusion within the gas stream has a different effect because it is necessary to attain equilibrium over the short path between one particle and the next, and an increase in velocity cuts the time available for this. Crosswise mixing broadens any gas stream passing through the column, and the faster you move it, the broader it becomes. Thus, the HETP increases above the minimum value with increasing gas velocity. Increasing velocity also decreases the time available for liquid diffusion within the particle and thus increases HETP because the time for lighter material to diffuse out through the heavier film before advancing on to the next particle causes relatively more mixing and lower efficiency at higher feed rates. Both liquid and gaseous diffusion effects also dictate relatively small particle size, since the distance through which this material has to diffuse within the particle and between particles decreases with decreasing diameter.

The initial condensation of warm feed gas encountering the cold packing does very little of the separation involved in the process, because this is only the equivalent of one theoretical plate. It is the equilibration at all points along the column which is most important. This equilibration is between the liquid and gas revapourised at each point by the heat of condensation of the relatively less volatile liquid which condenses on the same particle. This revapourised liquid in turn, condenses on the next cold particle encountered in its path of flow through the column, so that the process is repeated. The process is particularly valuable with very difficult separations, where a high number of theoretical plates is required. It will be seen that it gives enormous plate efficiency because the length of path through which the material has to diffuse is very short, both in the gas phase between particles and in the liquid phase within the liquid layer condensed on an individual particle.

It is most important to avoid any dripping or liquid flow within the column, since this destroys the separation already attained. For a given packing, the capacity of the condenser per unit volume depends upon the temperature difference between cold solid and incoming gas, and there is a maximum temperature which cannot be exceeded without flooding. This temperature difference is related to the heat capacity of the packing, the heat of vapourisation of the liquid condensed and the liquid retention capacity of the packing as follows:

$$\text{wt. of liquid condensed} = \frac{\text{heat capacity} \times t. \text{ difference}}{\text{Latent heat of vapourisation}}$$

This equation says that the weight of liquid condensed equals the heat capacity of the packing per unit volume times the temperature difference between the cold solid and the incoming gas, divided by the heat of vapourisation of the condensing liquid (on a weight basis). The maximum permissible loading is highest for the least volatile material and successively less for more volatile materials. This quantity must be limited so that the weight of liquid condensed per unit volume of the packing does not exceed its liquid retention capacity. For a given packing and liquid feed, the temperature rise should not exceed the limit thus set.

While the system of this invention could be used in principle for wide cuts, it will frequently be found that the conventional methods of refining such as fractional distillation may be preferred for such easy separations. The wider the mixture to be separated, the larger the starting temperature difference which must be employed. Conversely, too low a temperature difference has no harmful effect, aside from reducing the capacity of the system. The net result of these factors is that if there is wide spread in relative volatility between the constituents being separated, the column must be operated at low capacity for all constituents present so as to avoid flooding with the constituent which is the least volatile. The easier the materials are to separate by distillation, the harder they are to handle by this method which leads us to apply this chiefly to materials difficult to separate.

Two factors mentioned above are particularly important in determining the efficiency of a given packing condenser: uniform column packing, and keeping the system adiabatic. It is somewhat easier to pack uniformly with particles of uniform size, but the controlling factor is the packing technique. It is particularly important not to segregate large and small particles in the same cross-sectional area of the column, since this will result in channeling and a loss in column efficiency. The column is usually packed in a vertical direction, using a tamping motion, and preferably adding the packing in the form of a liquid slurry so that it can be readily homogenised during the settling and packing step. The column will ordinarily be operated in the same vertical orientation as that used in the initial packing, since moving it to the horizontal direction will have a tendency to cause some channeling along the top confining wall.

It is envisaged that the present invention may be used on a large scale e.g. utilising a ton or more of packing. The caking of the packing in tall, substantially vertical columns may be prevented by supporting the packing on grids at various intervals. For such installation it is preferred that the condensation zone be a series of substantially vertical pipes or columns connected together so that the gaseous stream flows up or down each pipe or column.

Several methods may be employed to keep the system adiabatic. A thin metal wall, externally insulated as by a vacuum jacket, will cut wall effects to the minimum. It may be desirable to provide an external heat supply, electrically or otherwise controlled so as to maintain the external column temperature substantially the same as that of the packed material inside the condenser at each zone in a manner familiar to the operation of distillation columns. The external temperature may thus be controlled so as to follow changes in temperature inside the column. In larger sized equipment, the main portion of the working face of the column will be substantially adiabatic and the effect of the heat loss through the wall will be felt only in a narrow outer annulus of the packing. The width of this annulus will be only a few inches, determined by the length of the path of thermal diffusion during the time required for the feed to pass through the entire length of the condenser.

One simple means of correcting for this effect is to discard from the product stream all desorbed material which appears in an annulus next to the wall. A simple annular guard ring near the exit from the condenser may be used to isolate material to be discarded from the main product stream. For example, this guard ring may take the form of a short cylindrical partition coaxial with the condenser wall, opening at the exit end to a separate collecting header. Desorbed material in the annulus between the condenser wall and this guard ring passes out into the separate collecting header, from which it may be recycled to the system for re-separation, or discarded or used otherwise as desired. The main product stream issues from the exit end of the condenser into the main header, collecting all material except that segregated by the guard ring. The width of the narrow annulus space between the guard ring and the condenser wall is sufficient to segregate from the main product stream material which has not been efficiently separated due to heat leaks through the vessel wall. It will frequently be found that the material segregated within this guard ring may be of good quality and combinable with the main product stream during much of the operating cycle, and need only be segregated during periods when the composition of one stream or the other is undergoing a change.

The operation of the process may be facilitated by measuring the temperature of the packing at several points within the column and so obtain the temperature gradient down the column. By this means the position of the cold front is indicated.

Columns of large diameter can be packed in sections, separated by a front straightening device. For example, at the exit end from each such packed section, the material may be made to pass through an orifice plate with a single hole, leading to a mixing chamber and grid arrangement to insure turbulence. The grid in such a chamber leads to the next packed section, where the pressure drop through the packing is sufficient to insure uniform distribution of heat vapour across the cross-section of the column. If the column is not being operated under adiabatic conditions, it may be also desirable to insert a purge ring at each of these orifice plates, as well as at the exit from the column.

The process of the present invention is applicable to the separation of vapourisable olefins, paraffins, aldehydes, ketones, esters, halogen, organic compounds and aromatic compounds. The preferred olefins and esters contain from 2 to 35 carbon atoms. Liquid air, rare gases, heavy water and volatile compounds of isotopes may be processed.

In the practice of this invention in a typical hydrocarbon separation the following data are exemplary: A 1½ inch diameter condenser tube having a cross-sectional area of 10 sq. cms. and 8 ft. long is tightly and uniformly packed with 2,400 cc. of 30–50 mesh kieselguhr particles. The packed kieselguhr has a density of about 0.35 to 0.66 gm. per ml. The temperature of the packed condenser tube is adjusted to between room temperature and about 50° C. by passing through it a stream of dry air at the desired temperature. Under these conditions the packing has a liquid retention volume of about 0.10 to 0.20 gm. per cc. for a hexane hydrocarbon, depending upon the particle density and packing procedure.

A mixed feed containing 50—50 mol percent of normal hexane and 2-methyl pentane is fed to this column, at a vapour temperature of from 100 to 170° C. The total liquid retention capacity of the column under these conditions is about 3 to 5 gm. mols or 250 to 420 gms. of the mixed hexane feed. This amount of the hot hexane vapours is fed to the condenser over a period of from 10 minutes to 10 hours, preferably about one hour. The initial product is pure 2-methyl pentane which issues from the exit of the condenser at its boiling point, 60.2° C. The mixed feed may be continued beyond this time if desired, as the wave front of enriched normal hexane advances through the column toward the exit. Under these conditions, the inlet portion of the condenser comes up to inlet gas temperature with no condensate, with more and more of the column reaching this temperature as relatively cool product issues from the exit end.

The purified methyl pentane and normal hexane regions within the condenser are separated by a narrow band of mixed hydrocarbons which contain about 7 gms. of material changing in composition from essentially pure methyl pentane down to pure normal hexane, within about 4 cms. of column length. The mixed feed is terminated preferably at the end of one hour at the rate given or alternatively just before this narrow band of varying composition approaches the exit of the column. The pressure at the exit end of the column is then reduced to about 100 mms. Hg whereupon the remaining pure methyl pentane and mixed product fraction are pumped out of the system in that order. After methyl pentane has been completely removed, the product stream removed from the condenser at reduced pressure is pure normal hexane.

By stopping the mixed feed as soon as its amount equals the liquid retention capacity of the column, the vapourisation of the total condensate cools back to the original temperature of 50° C. the packing which has been warmed to the boiling point of hexane by the heat of the incoming gas stream. Where the feed has been continued beyond this time, additional cooling is required to restore this original temperature. This additional cooling is provided by first vapourising all condensate within the column and then blowing it with a stream of dry air at 50° C. Example:

As a further example of this method of separation, a ⅞ inch diameter vertical glass tube is packed to a depth of 4 feet with coarse graded celite particles, at a bulk density of about 0.37 gm. per ml. This section is wrapped with a one inch insulating layer of fiberglass and operation is started with the condensation zone at room temperature. The top of the column constitutes a vapourisation chamber which is surrounded throughout the run by a steam jacket at 100° C.

A mixed liquid feed comprising 10 ml. of pure n-hexane and 10 ml. of 2-methyl pentane is added to the top of the column through the vapourisation chamber, over a period of 10 minutes. No liquid appears on the cold packing during this addition. The feed line is then closed off and the pressure at the bottom of the column reduced steadily to about 200 mm. Hg over a period of about 20 hours.

Under these conditions the first product of purified 2-methyl pentane issues from the bottom of the column at 35 minutes. The separating zone of mixed composition is followed by a zone of purified n-hexane representing 20% of the total feed at better than 96% purity.

In this small-scale test demonstrating the new method of separation, the heat capacity of the column wall relative to the packing and the rate of heat leakage to the unheated surroundings are both high subtracting from the efficiency of the operation. Markedly superior results are obtained in larger equipment where the disturbing effect of the heat leaks noted above is much less significant.

The finely divided porous packing used under the conditions of this invention is an efficient heat interchanger, and this leads to a particularly useful modification of the invention. The feed gas may be introduced into a warm section, followed by a cold section and then by a final warm section returning the product to the inlet temperature. Under these conditions, the inlet warm section will have no effect of any sort. The usual displacement condensation takes place in the cold section and the cold product issuing from the cold section will itself cool the final warm section. The net result is a gradual motion of the cold zone from the middle of the column toward the exit end. This process is continued until the cold zone has come close enough to the exit that some of the cold would begin to be lost into the product stream, at which time the operation is terminated. The condenser is then prepared for re-use by stripping off all condensate, preferably by the use of reduced pressure to recover the heat of vapourisation. Flow is then resumed in the reverse direction, whereupon the cold zone moves back to the middle and on to the other side, approaching the former inlet of the apparatus which is now the exit end. The operating cycle may thus be continued in a push-pull type of operation. The leakage of cold from the system in this arrangement is preferably compensated for after stripping by introducing a cold gas into the middle of the cold zone, and allowing it to flow symmetrically in both directions towards the end of the condenser. This maintains the middle part of the condenser at the lowest temperature, and the use of cold gas insures a uniform temperature across the working face at each level of the packed bed.

The arrangement is very economical of power, particularly where refrigeration is required. The only heat effects involved are those thermodynamically required for the separation, plus the small amount of energy required to pump the gas through the system. This is a marked contrast to the very high heat loads required in conventional refining processes such as distillation or solvent extraction, and to the heat losses which are commonly incurred in selective adsorption or gas chromatography.

It is particularly useful with volatile materials, such as those which are gases at room temperature. The cold product gas loses all of its heat to the final warm zone without being condensed, and it is recovered at the initial feed temperature. The system establishes its own temperature gradient as before, and the only requirement is to keep it as nearly adiabatic as possible.

What is claimed is:

1. Method of separating mixture of volatile materials, which comprises introducing a relatively warm gaseous stream of said material into an adiabatic packed condensation zone containing an initially colder porous packing having a free volume sufficient to retain and immobilize all liquid condensed out of the gas stream onto the packing material, starting at a packing temperature which is below the condensation temperature of the most volatile constituent of the mixture, condensing at least a portion of said most volatile constituent on the packing which is thereby warmed to said condensation temperature, continuing the introduction of the gaseous mixture and thereby progressively warming the packing by the heat content of the incoming gas and by the progressive condensation thereon of less volatile constituents of the mixture having higher condensation temperatures, said further warming vaporizing from said packing the more volatile materials initially condensed thereon with a zero net transfer of liquid at all times, establishing a series of advancing fronts of revaporized material progressively enriched in concentration of the less volatile constituents of said initial gas mixture, with the most volatile materials advancing first through and out of the condensation zone, and terminating the introduction of said gaseous mixture to said packed condensation zone prior to a second front advancing out of said zone.

2. Method according to claim 1 in which the packing material is cleaned off and less volatile materials condensed thereon are recovered in their order of volatility, by stripping the packing of all condensate.

3. A method according to claim two wherein said stripping at least partly restores the packing to its initial cold state.

4. A method according to claim 3 wherein said stripping and cooling is accomplished by reducing the pressure on the packing.

5. The method according to claim 2 in which the temperature of the packing is restored to its initial cold state at least partly by flowing into it a cold permanent gas stream.

6. The method according to claim 2 in which said stripping is accomplished by purging the packed condenser with a gas which is not condensed at the operating temperature and pressure employed.

7. The method according to claim 1 in which said condensation zone is subsequently purged with a small portion of the previously purified, least volatile constituent of the gaseous mixture in gaseous form, and the packing is then cleaned off by stripping the condensate therefrom.

8. The method according to claim 1 in which a uniform temperature is maintained across the cross-section of the condensation zone by maintaining adiabatic conditions across the confining wall thereof.

9. The method according to claim 8 in which said adiabatic conditions are maintained by controlling the external temperature at each section of the confining wall at a temperature substantially the same as the changing temperature inside the wall.

10. A method according to claim 1 in which a uniform temperature is maintained across the working surface of the cross section of the condenser by discarding from the product stream all desorbed material which appears in an annulus next to the wall surrounding this working surface of uniform temperature.

11. The method according to claim 1 in which the temperature rise between the cold packing and the hot-mixed feed entering the condenser is limited to the liquid retention capacity of the packing, multiplied by the quotient of the latent heat of condensation of the most volatile vapor divided by the heat capacity of the packing, whereby flooding of the column and liquid transfer with the system is avoided.

12. The method according to claim 1 wherein said gaseous stream contacts a warm packing zone prior to contacting a zone of said colder packing and the product from said zone of colder packing flows through a second warm packing zone.

13. The method according to claim 12 wherein the condensation zone is purged with a gaseous portion of the previously purified, least volatile constituent of said gaseous mixture and the packing is then cleaned off by stripping the condensate therefrom.

14. The method according to claim 12 wherein the zone of said colder packing enlarges gradually into said second warm packing zone.

15. The method according to claim 12 wherein a first cycle proceeding through the condensation zone in one direction is followed by a stripping step, then by a second cycle in which the feed flows through the condensation zone in the opposite direction, terminating feed during said second cycle prior to a second front advancing out of said zone of colder packing, stripping said condensation zone of condensate and repeating the cycles.

16. The method according to claim 12 wherein said condensation zone is stripped of condensate by reducing the pressure therein.

17. A method for separating a mixture of volatile materials which comprises feeding a relatively warm gaseous stream of said mixture into a packed, adiabatic condensation zone, said packing being initially at a temperature below the condensation temperature of the most volatile constituent of said mixture, maintaining a feed rate to said condensation zone below that at which any flow of condensed liquid occurs therein, whereby a series of advancing fronts of condensed material is formed, the most advanced front comprising an enriched concentration of the most volatile constituent at its condensation temperature, allowing said advanced front to substantially exit from said condensation zone and thereupon terminating the feed of said mixture to said condensation zone.

18. A method for separating a mixture of volatile materials which comprises passing a relatively warm gaseous stream of said mixture into a packed, adiabatic condensation zone, said packing being initially at a temperature below the condensation temperature of the most volatile constituent of said mixture and having a free volume sufficient to retain and immobilize all liquid condensed in said zone, whereby a portion of the most volatile material of said mixture is condensed, forming a series of advancing bands of condensed material, the most advanced band comprising an enriched concentration of the most volatile material at its condensation temperature, removing substantially all of said most advanced band from said condensation zone and thereafter terminating the feed of said mixture to said zone.

References Cited in the file of this patent

UNITED STATES PATENTS

| | | |
|---|---|---|
| 524,704 | Perrier | Aug. 21, 1894 |
| 911,311 | MacKaye | Feb. 2, 1909 |
| 2,415,411 | Bowman | Feb. 11, 1947 |
| 2,607,440 | Lewis | Aug. 19, 1952 |
| 2,684,933 | Findlay | July 27, 1954 |
| 2,875,606 | Robinson | Mar. 3, 1959 |

FOREIGN PATENTS

| | | |
|---|---|---|
| 345,579 | Great Britain | Mar. 26, 1931 |